(12) United States Patent
Whitten et al.

(10) Patent No.: US 8,958,519 B2
(45) Date of Patent: Feb. 17, 2015

(54) INCORE INSTRUMENTATION CABLE ROUTING AND SUPPORT ELEMENT FOR PRESSURIZED WATER REACTOR

(71) Applicant: Babcock & Wilcox mPower, Inc., Charlotte, NC (US)

(72) Inventors: Andrew C. Whitten, Lynchburg, VA (US); Michael J. Edwards, Forest, VA (US)

(73) Assignee: Babcock & Wilcox mPower, Inc., Charlotte, NC (US)

( * ) Notice: Subject to any disclaimer, the term of this patent is extended or adjusted under 35 U.S.C. 154(b) by 178 days.

(21) Appl. No.: 13/668,740

(22) Filed: Nov. 5, 2012

(65) Prior Publication Data

US 2013/0272467 A1 Oct. 17, 2013

Related U.S. Application Data

(60) Provisional application No. 61/625,387, filed on Apr. 17, 2012.

(51) Int. Cl.
*G21C 19/20* (2006.01)
*G21C 17/00* (2006.01)
*G21C 13/02* (2006.01)
*G21C 13/036* (2006.01)

(52) U.S. Cl.
CPC .............. *G21C 17/00* (2013.01); *G21C 19/207* (2013.01); *G21C 19/20* (2013.01); *G21C 13/02* (2013.01); *G21C 13/036* (2013.01); *Y02E 30/40* (2013.01)

USPC ............................ 376/245; 376/254; 376/260

(58) Field of Classification Search
CPC ....... G21C 19/20; G21C 17/00; G21C 19/207; G21C 13/02; G21C 13/036; Y02E 30/40
USPC ........................ 376/245, 254, 260, 292, 342
See application file for complete search history.

(56) References Cited

U.S. PATENT DOCUMENTS

| | | | | |
|---|---|---|---|---|
| 5,448,603 | A * | 9/1995 | Lynch ........................... | 376/245 |
| 8,681,920 | B2 * | 3/2014 | Heibel et al. .................. | 376/245 |
| 2003/0169839 | A1* | 9/2003 | Matteson ....................... | 376/260 |
| 2012/0177166 | A1* | 7/2012 | Seidel et al. .................. | 376/254 |

* cited by examiner

*Primary Examiner* — Jack W Keith
*Assistant Examiner* — Daniel Wasil
(74) *Attorney, Agent, or Firm* — Michael J. Seymour; Eric Marich

(57) ABSTRACT

A nuclear reactor comprises a pressure vessel, a nuclear reactor core comprising fissile material disposed in the pressure vessel, and a core basket disposed in the pressure vessel and containing the nuclear reactor core. An incore instrument is disposed in a guide tube of the nuclear reactor core. The incore instrument has a cable extending out of the bottom of the nuclear reactor core and making a 180° turn. A bottom support element is attached to the bottom of the core basket and defines or includes a routing tube that routes the cable of the incore instrument through the 180° turn. In some embodiments, the pressure vessel includes upper and lower vessel portions, the nuclear reactor core and core basket are disposed in the lower vessel portion, and the vessel penetration is through the lower vessel portion or through a mid-flange connecting the upper and lower vessel portions.

16 Claims, 7 Drawing Sheets

INCORE INSTRUMENTATION CABLE ROUTING AND SUPPORT ELEMENT FOR PRESSURIZED WATER REACTOR

This application claims the benefit of U.S. Provisional Application No. 61/625,387, filed Apr. 17, 2012. U.S. Provisional Application No. 61/625,387, filed Apr. 17, 2012 is hereby incorporated by reference in its entirety into the specification of this application.

BRIEF SUMMARY

The following relates to the nuclear reactor arts, nuclear power generation arts, nuclear reactor instrumentation arts, nuclear reactor hydrodynamic design arts, and related arts.

In nuclear reactor designs of the integral pressurized water reactor (integral PWR) type, a nuclear reactor core is immersed in primary coolant water at or near the bottom of a pressure vessel. In a typical design, the primary coolant is maintained in a subcooled liquid phase in a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated and rises through the central riser, discharges from the top of the central riser and reverses direction to flow downward back toward the reactor core through a downcomer annulus defined between the pressure vessel and the central riser. In the integral PWR design, the at least one steam generator is located inside the pressure vessel, typically in the downcomer annulus. Some illustrative integral PWR designs are described in Thome et al., "Integral Helical Coil Pressurized Water Nuclear Reactor", U.S. Pub. No. 2010/0316181 A1 published Dec. 16, 2010, which is incorporated herein by reference in its entirety. Other light water nuclear reactor designs such as PWR designs with external steam generators, boiling water reactors (BWRs) or so forth, vary the arrangement of the steam generator and other components, but usually locate the radioactive core at or near the bottom of a cylindrical pressure vessel in order to reduce the likelihood of air exposure of the reactor core in a loss of coolant accident (LOCA).

The nuclear reactor core is built up from multiple fuel assemblies. Each fuel assembly includes a number of fuel rods. Spaced vertically along the length of the fuel assembly are grid assemblies which provide structural support to the fuel rods. At the top and bottom of the fuel assembly are an upper end fitting and a lower end fitting, respectively. The fuel assembly also includes guide tubes interspersed among the fuel rods and welded to the grid assemblies. An array of fuel assemblies form the nuclear reactor core, which is contained in a core former. The entire core is supported in a core basket, which may for example be suspended from a lower flange of the pressure vessel or otherwise supported.

Control rods comprising neutron absorbing material are inserted into and lifted out of the guide tubes of the fuel assembly to control core reactivity. Instruments that monitor core conditions (e.g. reactor power, temperature, etc.) and their accompanying cabling may also be inserted into some of the guide tubes. Generally, a guide tube contains either a control rod or an instrument, but usually not both, due to space limitations. The instruments are called incores because they are located in the core. The incores may be located inside of a guide tube in the center or at the edge of a fuel assembly. Locating these instruments in the reactor core, or anywhere in the vessel, is a challenge because the reactor vessel contains high temperature and high pressure water and the core produces high levels of radiation.

In one approach, instrumentation in nuclear reactors have used thimble tubes and guide tubes, as disclosed in, for example, U.S. Pat. No. 5,120,491 to Brown et al, filed Sep. 17, 1991. Thimble tubes, which contain primary pressure, run from a seal table through the vessel and into a guide tube. The thimble tubes typically enter the reactor vessel at either the vessel head or the bottom of the vessel. The thimble tubes terminate at the seal table located outside of the reactor, e.g. in a dedicated compartment separate from the reactor compartment. By routing the tubes from above or below the reactor core, there is a (nearly) "straight shot" from the vessel penetration to the guide tube into which the incore instrument is loaded. However, if the tubes are routed from the bottom of the vessel, a leak from around the guide tube penetration would be below the reactor core, which is problematic for LOCA remediation. On the other hand, routing the tubes from above can interfere with control rod drives or other upper internal components.

Disclosed herein are improvements that provide various benefits that will become apparent to the skilled artisan upon reading the following.

BRIEF SUMMARY

In accordance with one aspect, an apparatus comprises: a pressure vessel; a nuclear reactor core comprising fissile material disposed in the pressure vessel; a core basket disposed in the pressure vessel and containing the nuclear reactor core; an incore instrument disposed in a guide tube of the nuclear reactor core and having a cable extending out of the bottom of the nuclear reactor core and making a 180° turn; and a bottom support element attached to the bottom of the core basket and defining or including a routing tube that routes the cable of the incore instrument through the 180° turn.

In accordance with another aspect, an apparatus comprises: a method performed in conjunction with the apparatus of the immediately preceding paragraph includes: retracting the cable to move the incore instrument out of the guide tube of the nuclear reactor core and into the routing tube of the bottom support element; performing maintenance of the apparatus including replacing the guide tube with a different guide tube; and re-inserting the cable to move the incore instrument out of the routing tube of the bottom support element and into the different guide tube.

In accordance with another aspect, an apparatus comprises: a pressure vessel; a nuclear reactor core comprising fissile material disposed in the pressure vessel; a core basket disposed in the pressure vessel and containing the nuclear reactor core; and an incore instrument disposed in a guide tube of the nuclear reactor core and having a cable extending out of the bottom of the nuclear reactor core, making a 180° turn, and extending upward after the 180° turn to a vessel penetration located above the nuclear reactor core and below a top of the pressure vessel.

In accordance with another aspect, an apparatus comprises a core basket configured to contain a nuclear reactor core, and a bottom support element attached to the bottom of the core basket and defining or including a routing tube shaped to route a cable extending out of the bottom of the core basket through a 180° turn. In some embodiments the bottom support element has an egg crate grid structure.

BRIEF DESCRIPTION OF THE DRAWINGS

The invention may take form in various components and arrangements of components, and in various process opera

DETAILED DESCRIPTION OF THE PREFERRED EMBODIMENTS

Figure 1:
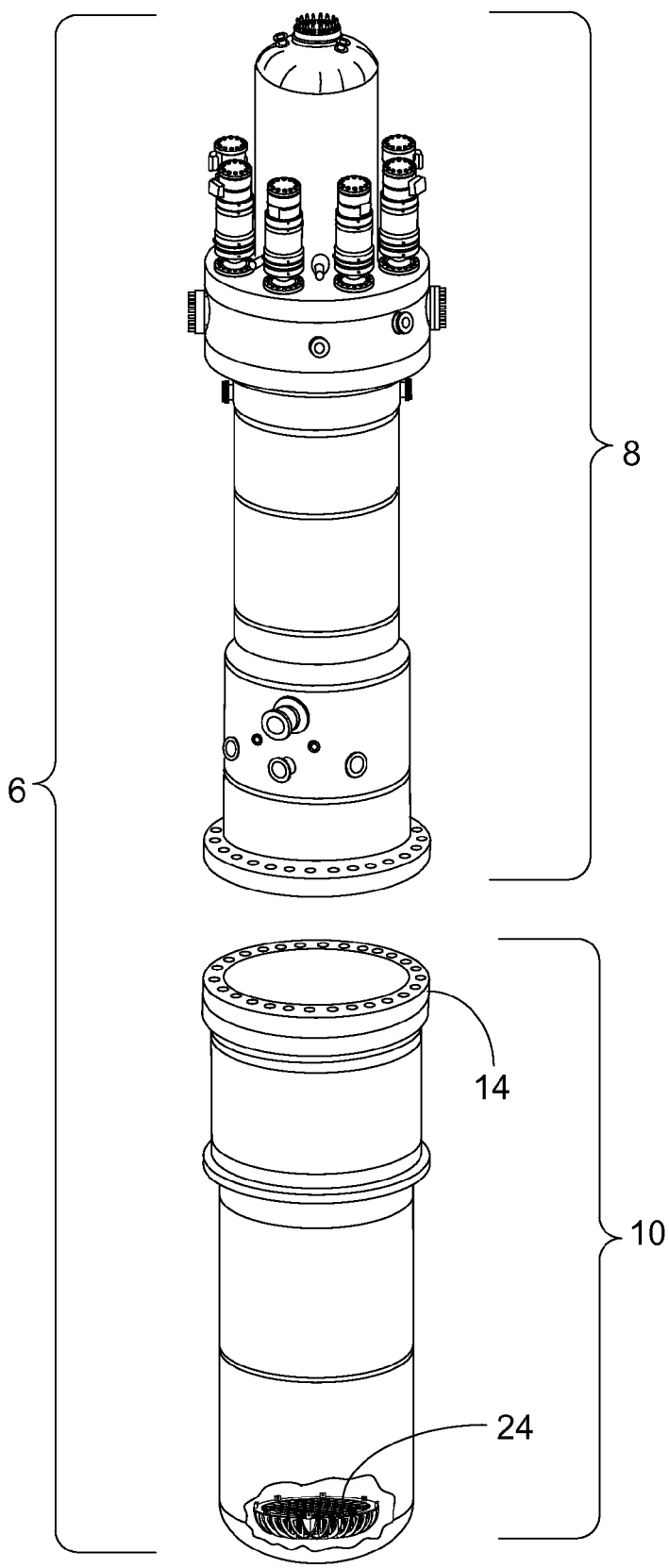
- FIG. 1 illustrates the upper and lower half of a small modular reactor, with an incore instrumentation cable routing and support element diagrammatically shown by partial cutaway of the lower vessel.

FIG. 1 illustrates an integral reactor pressure vessel 6 including an upper vessel 8 and a lower vessel 10. The vessel portions 8, 10 are joined at a mid-flange 14 during operation, but FIG. 1 shows the upper vessel 8 lifted off the midflange 14 of the lower vessel, (e.g., for refueling). In an integral reactor, the vessel houses the reactor core, reactor internals, and steam generator in a common pressure boundary, i.e. in the pressure vessel 6. The integral reactor of FIG. 1 is designed so that the upper vessel 8 contains the steam generators and may be removed as a unit (including the steam generators) for refueling.

Figure 2:
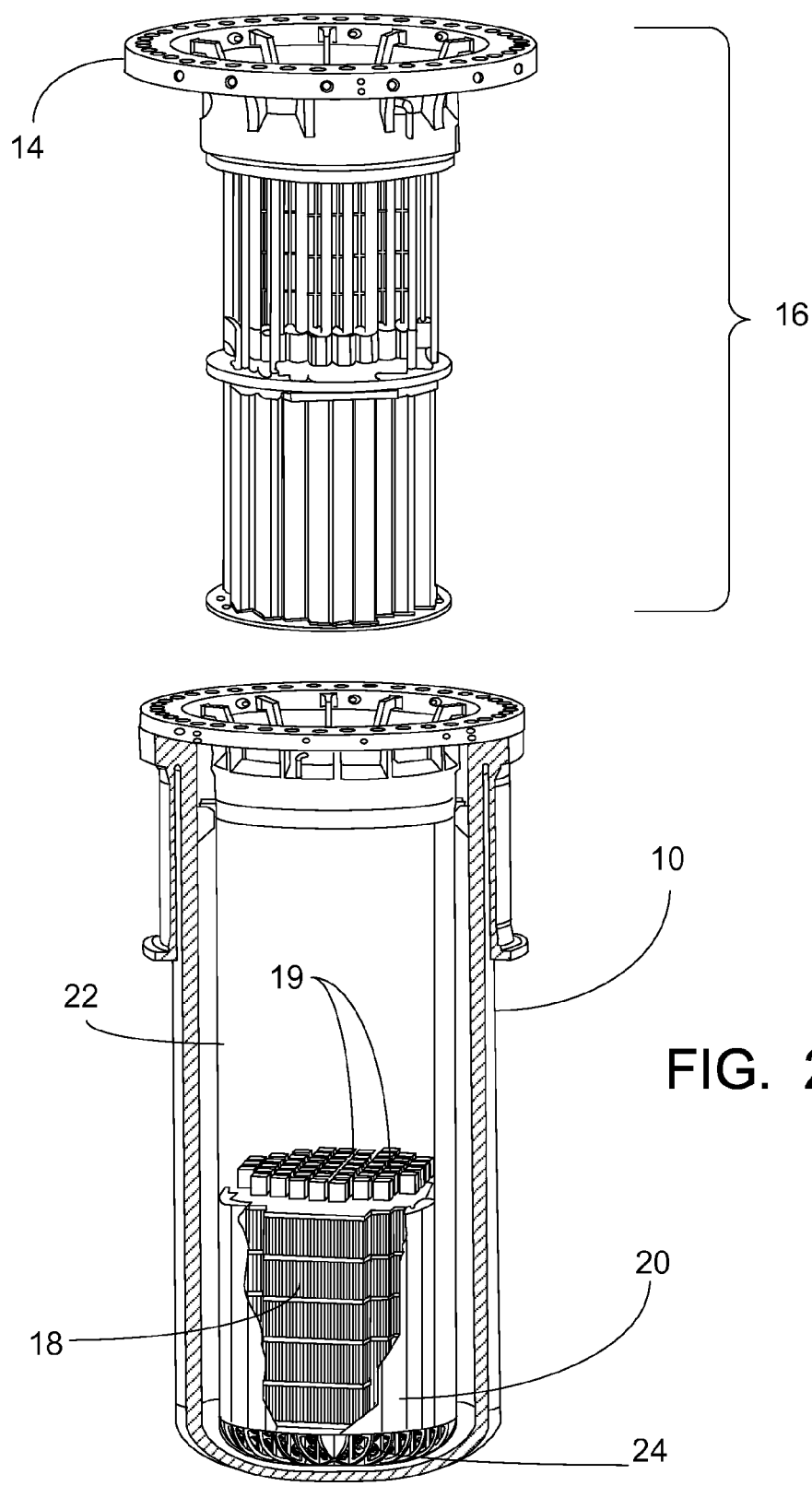
FIG. 2 illustrates the lower half of the small modular reactor including the incore instrumentation cable routing and support element in exploded view.

FIG. 2 shows the components contained in the illustrative lower vessel 10: upper internals 16 which are suspended from the mid-flange 14, an illustrative reactor core 18 made up of an array of fuel assemblies 19, a core former 20, and core basket 22. The reactor core 18 is shown diagrammatically comprising only a few fuel assemblies 19; more typically the core includes several dozen fuel assemblies (e.g., 69 fuel assemblies in the embodiments of FIGS. 5 and 6). The upper internals 16 may include components such as control rod guide frames that guide the control rod assemblies, internal CRDMs, internal reactor coolant pumps (RCPs), and so forth. (In FIG. 2, the upper internals 16 are illustrated showing only the structural frame including hanger plates and tie rods, and a set of RCPs at the mid-flange 14; however, in some embodiments the internal RCPs may be omitted in favor of externally mounted RCPs).

During reactor operation, the reactor core 18 is monitored by incore instrumentation, which is routed from the core to a feedthrough porting the incore cabling out of the pressure vessel. Within the reactor core, a few guide tubes are used for incore instrumentation. (The remaining guide tubes in the core serve to receive control rods). Outside the reactor core 18, routing tubes convey the cabling from the reactor core at least up to the feedthrough passing through the pressure vessel wall. Note that the term "guide tube" is sometimes used in the art to refer not only to guide tubes in the reactor core but also to tubing serving as cable conduits outside of the reactor core. For this disclosure, to avoid confusion, tubing that houses incore cables outside of the core is referred to as a "routing tube." The term "guide tube" is used to refer to the guide tubes that are part of the reactor core. The incore instrument cabling itself may be a mineral insulated cable (MI cable), and/or may include a thimble tube sheathing the electrical conductor. In either case, routing tubes provide support for the incore cables, preventing flow induced vibration from damaging the cables.

The illustrative nuclear reactor is a compact small modular reactor (SMR) including integral steam generators and also internal control rod drive mechanisms (internal CRDMs) disposed inside the pressure vessel. Additionally, the illustrative SMR is a pressurized water reactor (PWR) that includes an internal pressurizer defined by a steam bubble at the top of the upper vessel 8, with pressure controlled by suitable inputs such a resistive heaters for heating/expanding the steam bubble and spargers for cooling/contracting the steam bubble (details not shown). Routing incore instrumentation cabling from above and around or through the internal pressurizer, internal steam generators, and internal CRDMs would be challenging. Running cabling through the CRDMs also poses a problem during refueling because the cabling will typically need to be removed to facilitate removal of the CRDMs in order to access the reactor core. Routing incore cabling through the bottom of the pressure vessel is also undesirable because it requires penetrations below the reactor core, which is problematic from a loss of coolant accident (LOCA) management standpoint. While routing incore cabling from above or below is particularly problematic for a SMR due to its compactness, similar incore cable routing problems arise in the context of other types of nuclear reactors.

It is disclosed herein to route the incore instrumentation cabling from a side port, and to route the cables downward (for example, through the annulus defined between the core basket 22 and the lower pressure vessel 10, suitably secure to the periphery of the upper internals structural skeleton or to an inside wall of the lower vessel 10) to the bottom of the reactor vessel and then back up into the reactor core 18 from below. For example, the incore instrumentation cabling may be ported through the pressure vessel via feedthroughs at or near the midflange 14. This routing advantageously places the incore feedthroughs above the reactor core 18 while also avoiding routing the incore cables centrally through the upper internals 16. The routing does include a relatively sharp 90° downward turn of the cabling proximate to the midflange 14. However, the requisite bend radius of the incore cables is generally well within tolerances for most MI cables (e.g., a typical MI cable has a bend radius on the order of 18 inches), and moreover this region is relatively easy to access during an opening in which the upper vessel 8 has been removed.

A more substantial difficulty is the 180° turn of the incore cables at the bottom of the pressure vessel in order to enter the reactor core 18 from below. This is also a relatively sharp turn, and moreover the region below the reactor core 18 is not readily accessible even when the upper vessel 8 has been removed. Moreover, the upward cable portion of each incore cable must be precisely aligned with the receiving guide tube of the reactor core 18 in order to enter it. (As used in this context, the term "180° turn" denotes the turn in the incore cable that transitions between the portion of the cable running vertically in the guide tube of the reactor core and the portion of the cable routed from the bottom of the reactor core to an incore feedthrough located above the reactor core. The detailed shape of the 180° turn can vary, for example optionally having a nonuniform arc along its path, optionally having a tilt to accommodate a slightly slanted upward path between the 180° turn and the feedthrough, or so forth.)

As disclosed herein, the 180° cabling turn is facilitated through the use of a bottom support element 24 (shown in isolation via partial cutaway of the lower vessel 10 in FIG. 1, and shown in its intended position in the exploded view of FIG. 2) for incore instrumentation cable routing and support at the region of the 180° turn. The bottom support element 24 is located underneath the core basket 22 and includes routing tubes with the requisite 180° turn. The bottom support element 24 is located underneath the core basket 22 and is preferably secured to the core basket 22 in order to ensure precise alignment with the reactor core 18. In the illustrative embodiment in which the core basket 22 is suspended from the midflange 14, the bottom support element 24 clamps, bolts, or is otherwise secured onto the bottom of the core basket 22. As an added benefit, if the bottom support element 24 is of sufficient structural strength it can serve as a safety cushion or support for the reactor core 18 in the event that the suspension support of the core basket 22 fails. (It should be noted that structural failure of the core basket support is not expected to be a credible failure mode in most reactor designs).

Figure 3:
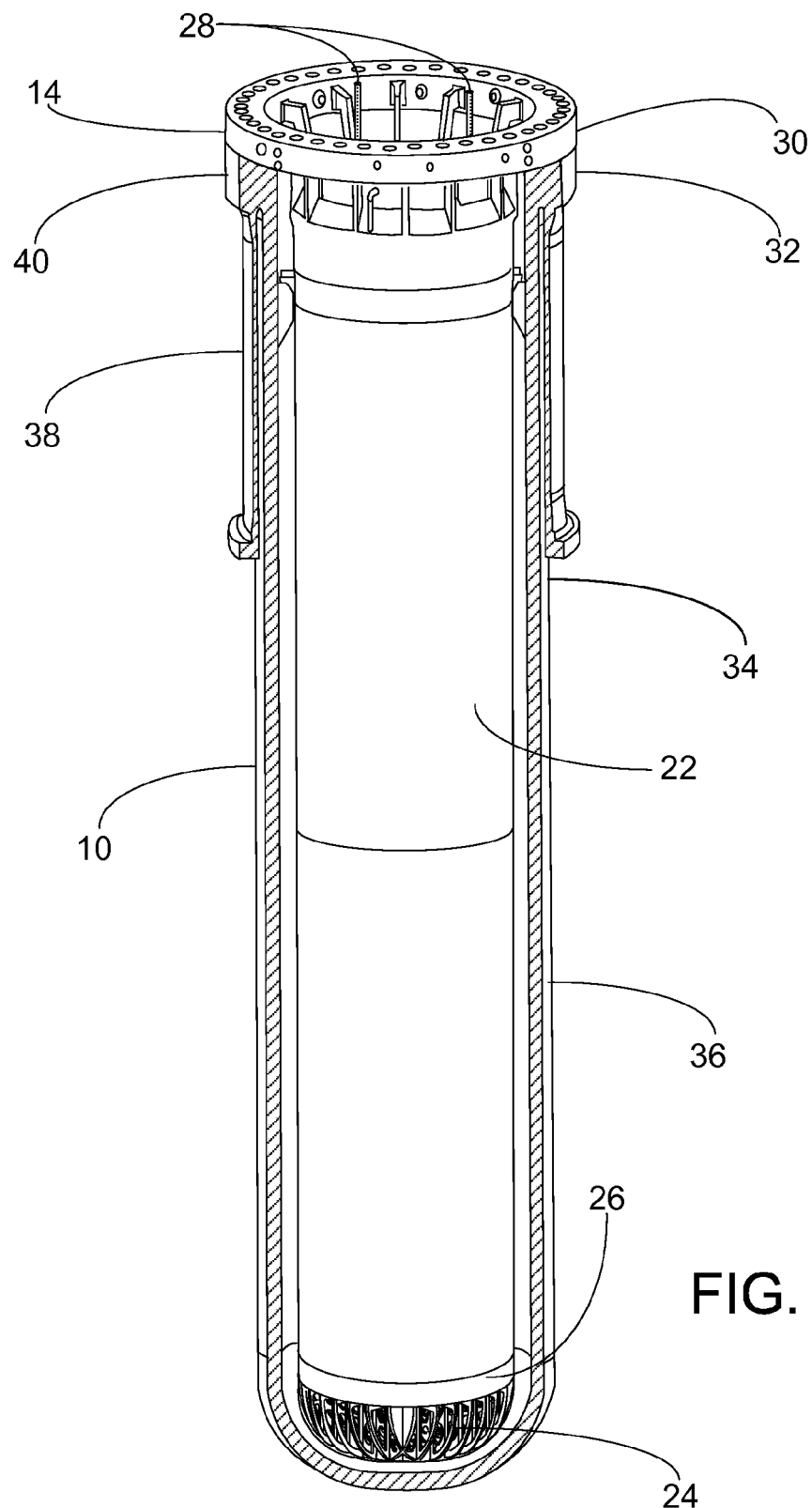
FIG. 3 illustrates a cutaway view of the lower half of the small modular reactor including the incore instrumentation cable routing and support element.

FIG. 3 shows a cutaway view of the lower reactor vessel 10 with three contemplated levels 30, 32, 34 for the vessel penetrations porting the incore cabling through the pressure vessel wall. The lower vessel 10 contains the core basket 22. The core basket 22 includes a lower core plate 26, and the bottom support element 24 is connected to the core basket 22 and (in the illustrative example) more particularly to the lower core plate 26. Attached to the top of the lower vessel 10 is the mid-flange 14. The vessel is supported by an optional support skirt 38 which connects to the lower vessel at the lower vessel flange 40. It is also noted that the separate mid-flange 14 is optionally omitted in favor of flanges on the upper and lower vessel sections that join directly together.

The illustrated three contemplated locations for the incore vessel penetrations are: through the midflange at level 30, through the top of the lower vessel at level 32, and below the support skirt through the vessel at level 34. The embodiment with the incore penetrations at level 30 is depicted in FIG. 3, as can be seen by the incore routing tubes 28 penetrating the mid-flange 14. In this arrangement 30, the incores are removed with the mid-flange 14.

In embodiments in which the incores penetrate the lower vessel flange 40 at level 32 and are routed to the bottom of the core, the incores can remain installed even if the mid-flange 14 is removed from the lower vessel 10. Indeed, the incores can even remain installed during refueling as the fuel assemblies are removed and replaced. This is suitably accomplished by retracting the incore and associated mineral insulated cables from the guide tubes of the core, so that the incore instruments at the distal ends of the incore cables reside inside routing tubes of the bottom support element 24.

As another contemplated approach, incore vessel penetrations 34 can be located at a lower location, which may be advantageous if the midflange 14 is too thick to machine feedthroughs (or is omitted entirely) and the vessel wall near the mid-flange is also thick. The total length of cabling is also reduced. The incore vessel penetrations are preferably located above the top of the core (indicated by level 36 in diagrammatic FIG. 3). Placing the penetrations below the top of the core is also possible, but such a location may be problematic if a LOCA occurs at the feedthrough.

The incore penetrations may be evenly spaced circumferentially around the lower vessel 10 or midflange 14. Depending upon the vessel penetration configuration, there may be multiple incore cables entering at each penetration, so as to decrease the total number of vessel penetrations. The incores may enter the reactor horizontally or at an angle. If the incores enter at an angle, the angle is preferably slanted downward from outside to inside, that is, slanting towards the reactor core 18 at the bottom of the vessel, so as to make the bend angle of the routing tube and incore cable less severe as it turns from the vessel penetration downward toward the core.

Figure 4:
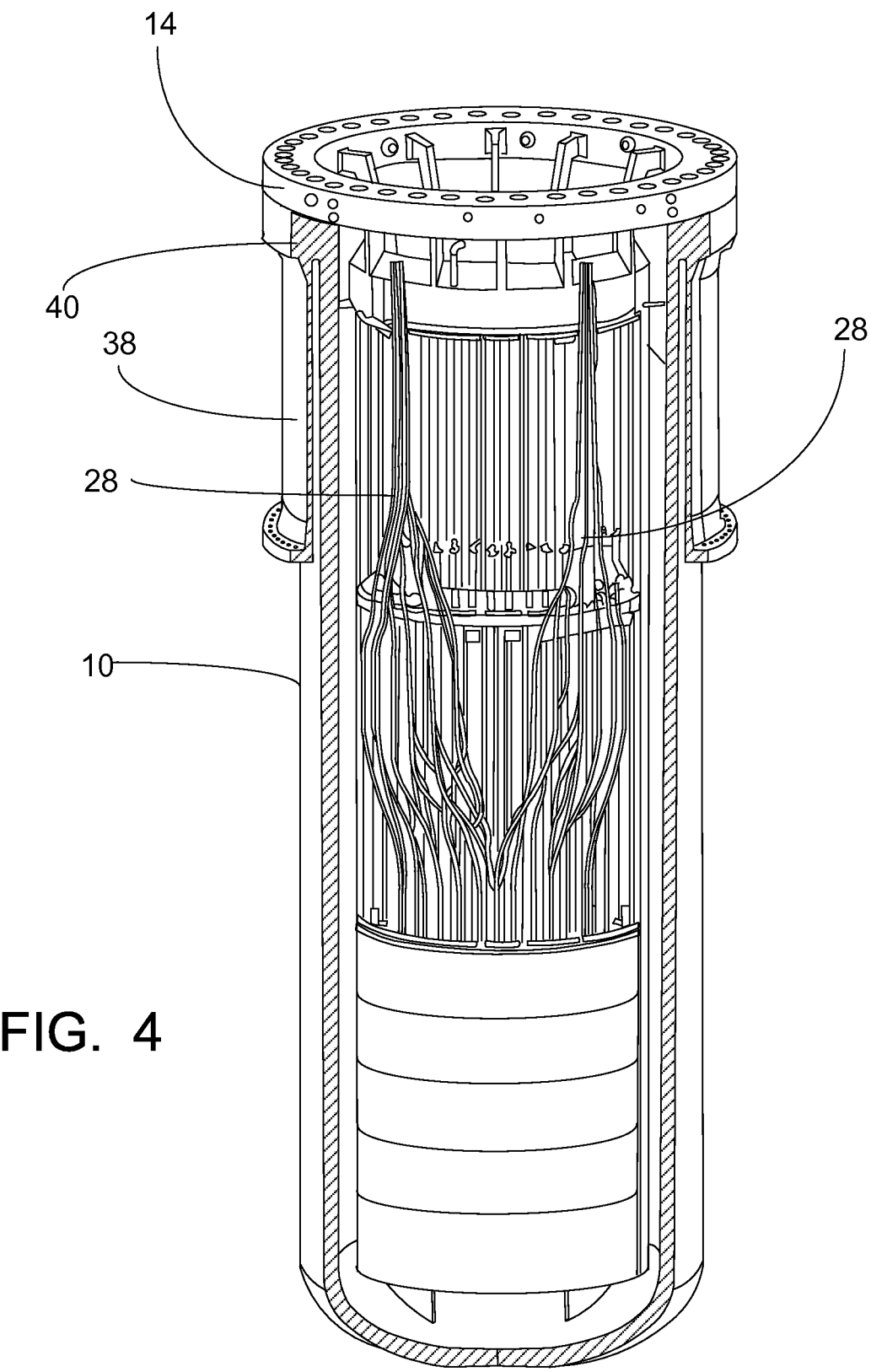
FIG. 4 illustrates a cutaway view of the lower half of the small modular reactor showing the path of the incore routing tubes.

From the midflange or lower vessel wall, the incores, contained in routing tubes, are routed vertically to enter the core from either the top or the bottom. A suitable arrangement in which the incore cabling enters the core from the top is shown in FIG. 4. The incore penetrations may be through either the mid-flange 14 or lower vessel flange 40. From either location, the routing tubes 28 are routed through the upper internals to the core.

Figure 5:
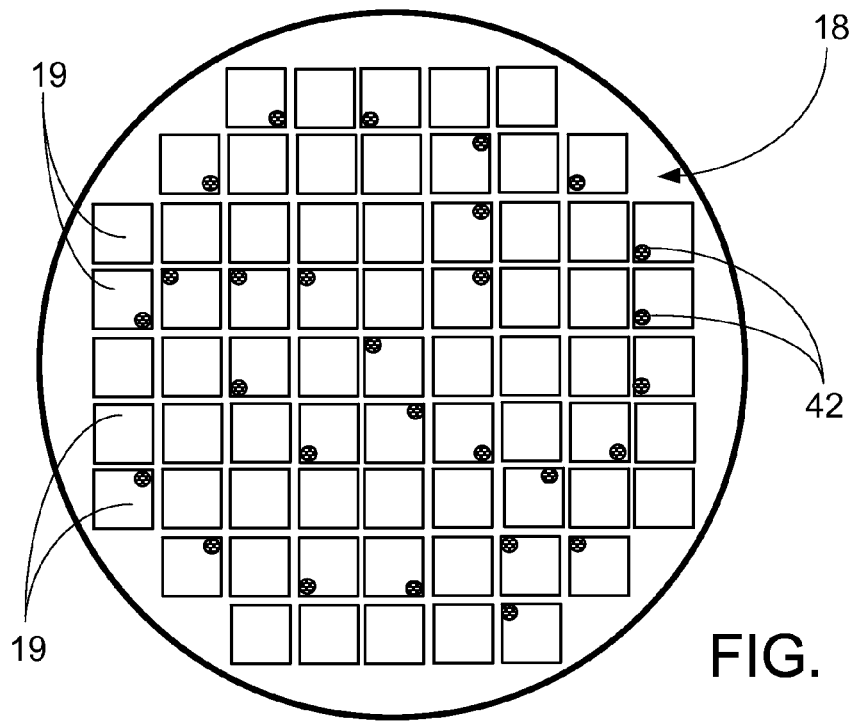
FIGS. 5 and 6 diagrammatically show two suitable arrangements of the incores in the fuel assemblies of the reactor core.

FIG. 5 shows an illustrative arrangement of the incores in the fuel elements if they are routed downward from above the reactor core 18. In this embodiment, the incores are routed to the edges of fuel assemblies 19 that make up the core 18 to avoid interference with the control rods. In the illustrative example, there are 28 incores and 69 fuel assemblies 19. The incores 42 are placed at the edges of selected fuel assemblies of the reactor core 18 to avoid interfering with the control rods and to allow the incore routing tubes to be routed around the CRDMs and out of the path of the control rod spider which supports the control rods. This makes the fuel elements asymmetrical, which can be introduce undesirable asymmetry in the burn of the fuel assemblies or in other fuel assembly performance characteristics.

Figure 6:
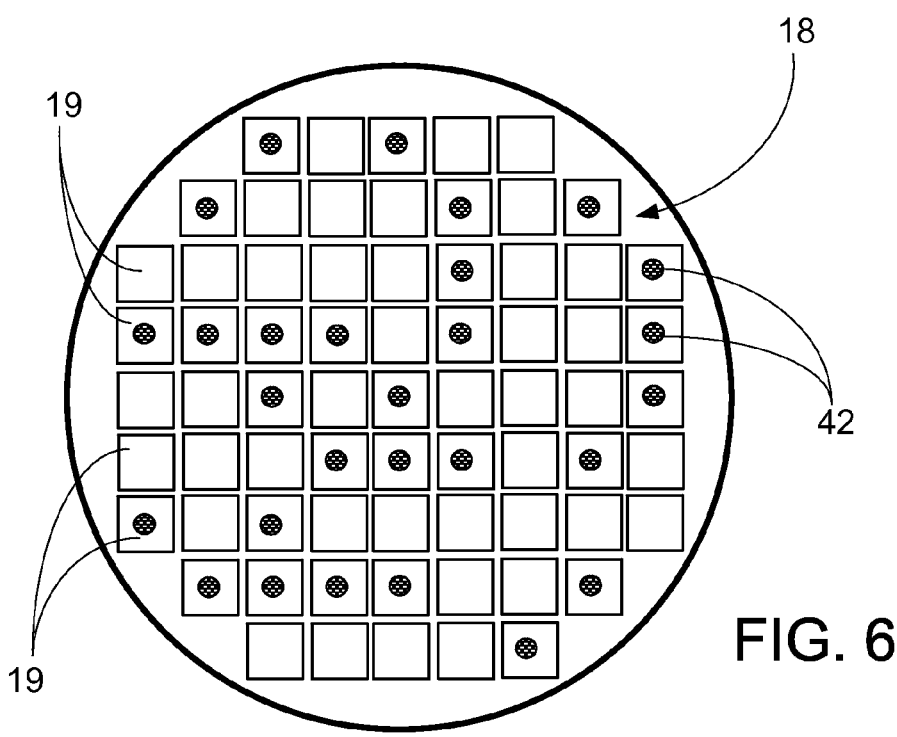

FIG. 6 shows an illustrative arrangement of the incores in the fuel elements when they are routed upward from below the reactor core 18. Entry via the bottom of the reactor core 18 advantageously facilitates placement of the incore instrument at the centers of the fuel assemblies 19 as the entry from the bottom does not interfere with the control rods.

The illustrative arrangements of FIGS. 5 and 6 assume a pressurized water reactor (PWR) configuration in which the control rods enter the reactor core 18 from above. In some boiling water reactor (BWR) configurations, the control rods enter the core from below. In this case, placement of the incore instrument at the center of the fuel assembly is more easily achieved for routing downward from above the reactor.

Returning momentarily to FIG. 3, if the routing tubes are routed to enter the reactor core from the bottom of the reactor core, the routing tubes are preferably routed along the outside of the core basket 22 to the bottom of the core basket. Toward this end, the 180° turn in the cables is facilitated by use of the bottom support element 24. The routing tubes can be secured to (e.g. welded to) and routed along the bottom support element 24 below the core basket 22 or, alternatively, the bottom support element itself can contain passageways that define routing tubes embedded in and integral with the bottom support element. In either case, after the incore cables make the 180° turn supported by the bottom support element 24, they each enter a designated guide tube in the reactor core 18. Accurately lining up this transition from routing along the bottom support element 24 to entering the guide tube inside the reactor core 18 is facilitated if the bottom support element 24 is secured to the core basket 22, as this arrangement eliminates the potential for relative movement between the bottom support element 24 and the core basket 22 (and hence reduces likelihood of relative movement between the bottom support element 24 and the reactor core 18 which is disposed in the core basket 22).

If routed through the lower vessel flange 32 or lower vessel wall and then to the bottom of the core, the incores may remain in the reactor vessel during refueling, sufficiently submerged in water to limit the radiation dose to personnel.

This is accomplished by pulling or otherwise retracting the incore cabling from the core by a length sufficient to withdraw the incore instrument out of the guide tube of the reactor core 18 and into the routing tube secured to (or integral with) the bottom support element 24. The fuel assemblies 19 making up the reactor core 18 can then be removed from the core basket 22 and new fuel assemblies loaded into the core basket. (Alternatively, the operation may entail fuel shuffling in which the fuel elements are removed and replaced at different locations, i.e. shuffled, to enhance uniformity of fuel burn over the volume of the core). After the refueling (or fuel shuffling) operation is completed, the incore cabling can be inserted back into the guide tubes of the new or shuffled fuel assemblies. With the bottom support element 24 secured to the bottom of the core basket 22, precise alignment between the routing tubes of the bottom support element 24 and the guide tubes of the fuel assemblies 19 is ensured, thus enabling this reinsertion of the incore instruments to be done in a "blind" fashion, e.g. by pushing the cables inward at the vessel penetration so that the cable and the incore instrument at the distal end of the cable are pushed into the guide tube of the reactor core.

While this installation is described as "blind", it is contemplated to monitor readings generated by the incore instrument to determine accurate placement of the incore instrument in the reactor core. For example, a radiation level sensor may be expected to produce maximum signal when the instrument is centered inside the fuel assembly. Additionally or alternatively, the blind installation can rely upon a known penetration distance—for example, if the cable is retracted a distance "x" to place the instrument inside the routing tube of the bottom support element 24 during commencement of refueling (or shuffling), then inserting the cable by the distance "x" should place the instrument back into its correct position inside the core.

During operation of the nuclear reactor, the bottom support element 24 provides support for the portion of the routing tube that guides the 180° cable turn. This is advantageous because the routing tubes are relatively flexible and susceptible to flow induced vibration.

Figure 7:
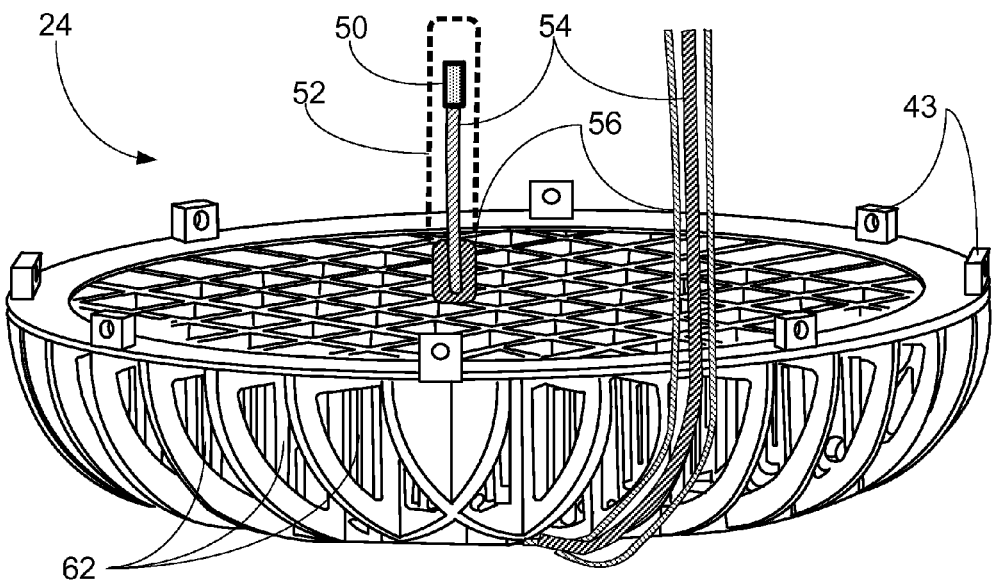
FIGS. 7-9 show perspective, side, and top views of one embodiment of the incore instrumentation cable routing and support element.
Figure 8:
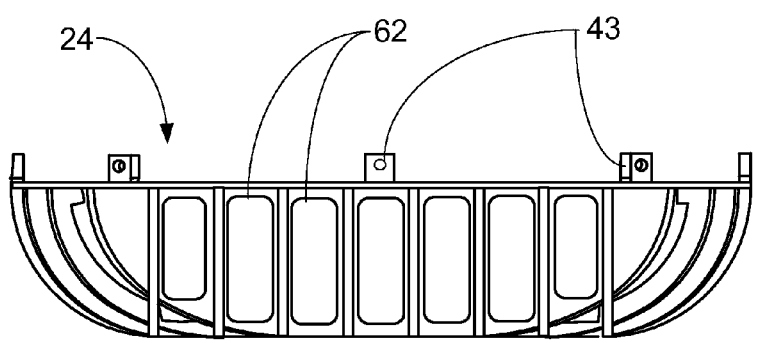
Figure 9:
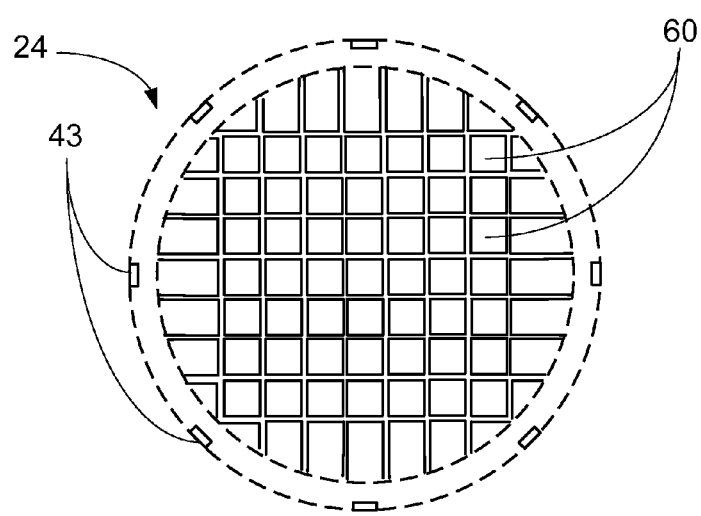

FIGS. 7, 8, and 9 show perspective, side, and top views, respectively, of the bottom support element 24. The bottom support element 24 is located below the core basket 22 (see FIG. 3) but still inside the primary pressure boundary (that is, inside the bottom vessel 10, as diagrammatically indicated in FIG. 1. The bottom support element 24 is not part of the primary pressure boundary. In some embodiments, the bottom support element 24 is also not in contact with the primary pressure boundary under normal conditions (said another way, is not in contact with the lower pressure vessel 10). Rather, the bottom support element 24 is attached to the lower core plate 26 of the core basket 22 (see FIG. 3), for example by mounting brackets 43 spaced apart around the outer periphery of the bottom support element 24.

In the embodiment of FIGS. 7-9, the bottom support element 24 comprises an egg crate grid to which the incore routing tubes attach to either continuously along the length of the routing tube or at discrete anchor points along the routing tube. For illustrative purposes, an incore instrument 50 is shown disposed in a guide tube 52 of the nuclear reactor core (the guide tube 52 is shown in phantom and the core is not shown in order to reveal the incore instrument 50 and its cable 54). A routing tube 56 is secured to the bottom support element 24 with 180° arc in order to guide the 180° turn of the guided cable 54. While only one routing tube 56 guiding one cable 54 of one incore instrument 50 is shown for illustration, it is to be understood that the bottom support element 24 may provide support and routing of a plurality of such incore instruments, e.g. the 28 incores of the embodiments of FIGS. 5 and 6. While the routing tube 56 is shown as a separate element secured to the bottom support element 24, in other contemplated embodiments (not shown) the bottom support element has internal passageways that serve as routing tubes for the incore cables (in other words, the routing tubes are integral with and defined by the bottom support element in these embodiments). The egg crate grid is largely open to allow primary coolant flow into the reactor core 18.

The support element 24 does not support the reactor core or core basket during normal operation. Rather, it serves to support the routing tubes as they make the (gradual) 180° turn into the guide tube of the reactor core. However, the bottom support element 24 optionally also functions as an "emergency" core support in the event of an abnormal event that causes the core basket support to fail. If the core basket were to become dislodged, the support element would keep the core raised off the vessel floor enough to allow natural circulation to continue to circulate water through the core. This optional emergency core support function assumes the support element 24 is strong enough to support the core and core basket—in some contemplated embodiments the support element is not sturdy enough to perform this function. (Again, it is noted that structural failure of the core basket support is not expected to be a credible failure mode in most reactor designs).

The grid work of the bottom support element 24 allows flow upward into the core via openings 60 (see FIG. 9) and allows lateral flow through openings 62 (see FIGS. 7 and 8) without causing problematic pressure drop. The bottom support element 24 allows the incore cables to enter the vessel from the sides and still be routed to the bottom of the core. Rigidly attaching the routing tubes to the bottom support element 24 reduces flow induced vibration of the routing tubes, which are relatively flexible. Flow induced vibration could induce failure of the routing tube either mechanically or by causing corrosion by working the metal.

When designing the bottom support element 24, one consideration is that the 180° turn of the routing tubes should not exceed the minimum allowable bend radius of the routing tubes or incore cabling. To increase the radius of the 180° turn, routing tubes that descend on one side of the core basket may enter fuel elements on the opposite side of the reactor core 18, crossing other routing tubes in the support element 24. Various layouts can be employed for this purpose. In such an approach with an optimized design, the smallest radius for the 180° turn can be expected for the incore instrument entering the fuel assembly or assemblies located at or nearest the center of the reactor core 18. (This is the example shown in FIG. 7).

The bottom support element 24 is suitably attached to the core basket 22 (and, in the illustrative embodiment, more particularly to the lower core plate 26 of the core basket 22) using pins or clamps to allow replacement and removal without major work to the entire core basket. In this approach the bottom support element 24 is a removable module that can be removed from the core basket 22 by removing the horizontal pins that keep it connected to the core basket, allowing it to be replaced or repaired if needed. The pins may be cap welded to prevent backing out. To remove the structure, the welds would be cut and the pins removed. It is also contemplated that bolts could be used, although irradiation (or hydrogen) embrittlement of threaded fasteners is a concern in nuclear components. The bottom support element 24 can alternatively be welded to the lower core plate 26, though welds would make it difficult to remove the structure for repair or replacement and may alter the properties of the metal. Additionally, some welds may be adversely affected by high radiation from the proximate reactor core 18.

In this regard, in some embodiments the bottom support element 24 does not include any welds, but rather is manufactured as a single-piece element by machining a blank, or by casting, forging, or another suitable process. The bottom support element 24 is suitably made of any structural material compatible with the nuclear reactor environment, such as being made of stainless steel, Inconel, or so forth.

Figure 10:
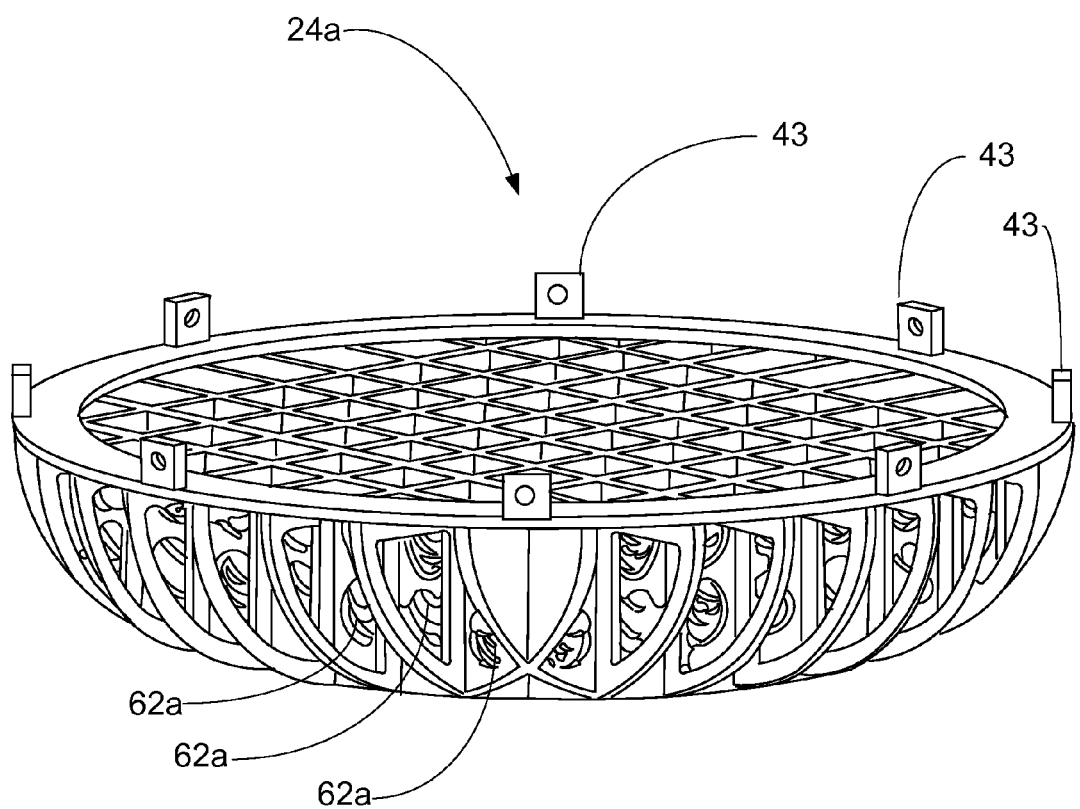
FIG. 10 is an alternative embodiment of the incore instrumentation cable routing and support element.

FIG. 10 shows an alternative design 24a for the support element which uses round flow holes 62a to allow lateral flow rather than rectangular holes 62 as in the embodiment of FIGS. 7-9. The size and shape and flow holes 62a can vary. It is also contemplated that the structure could have thicker walls with routing tubes machined (drilled) into the structure.

The egg crate grid of the illustrative support element 24 is rectilinear in plan view and suitably supports a rectilinear (in plan view) arrangement of routing tubes. However, non-rectilinear plan view configurations are also contemplated.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
   a pressure vessel;
   a nuclear reactor core comprising fissile material disposed in the pressure vessel;
   a core basket disposed in the pressure vessel and containing the nuclear reactor core;
   an incore instrument
       extending in a guide tube of the nuclear reactor core and
       having a cable extending out of a bottom of the nuclear reactor core and then making a 180° turn inside the pressure vessel; and
   a bottom support element located inside the pressure vessel,
       attached to a bottom of the core basket, and
       including a routing tube that routes the cable of the incore instrument through the 180° turn.

2. The apparatus of claim 1 wherein the bottom support element includes flow openings to allow flow of primary coolant water through the bottom support element and into the bottom of the nuclear reactor core.

3. The apparatus of claim 1 wherein the core basket includes a lower core plate and the bottom support element is attached to the lower core plate.

4. The apparatus of claim 1 wherein the bottom support element is attached to the core basket without welds.

5. The apparatus of claim 1 wherein the bottom support element does not include any welds.

6. The apparatus of claim 1 wherein the bottom support element has an egg crate grid structure.

7. The apparatus of claim 1 wherein the bottom support element does not contact the pressure vessel.

8. The apparatus of claim 1 wherein the core basket is suspended within the pressure vessel and the bottom support element is attached to the bottom of the core basket without contacting the pressure vessel.

9. The apparatus of claim 8 wherein the bottom support element has structural strength sufficient to support the core basket and the nuclear reactor core in the event that the core basket suspension fails.

10. The apparatus of claim 1 wherein the cable of the incore instrument extends upward after the 180° turn to a vessel penetration located above the nuclear reactor core and below a top of the pressure vessel.

11. The apparatus of claim 1 wherein:
   the pressure vessel includes an upper vessel portion and a lower vessel portion, the nuclear reactor core and core basket being disposed in the lower vessel portion, the cable of the incore instrument extending upward after the 180° turn to a vessel penetration through the lower vessel portion that is located above the nuclear reactor core.

12. The apparatus of claim 1 wherein:
   the pressure vessel includes an upper vessel portion, a lower vessel portion, and a mid-flange joining the upper and lower vessel portions, the nuclear reactor core and core basket being disposed in the lower vessel portion, the cable of the incore instrument extending upward after the 180° turn to a vessel penetration located in the mid-flange or in the lower vessel portion.

13. The apparatus of claim 12 wherein the core basket is suspended from the mid-flange.

14. A method performed in conjunction with a nuclear reactor including
   a pressure vessel,
   a nuclear reactor core comprising fissile material disposed in the pressure vessel,
   a core basket disposed in the pressure vessel and containing the nuclear reactor core,
   an incore instrument
       having a sensor disposed in a guide tube of the nuclear reactor core and
       having a cable extending out of a bottom of the nuclear reactor core and then making a 180° turn inside the pressure vessel, and
   a bottom support element located inside the pressure vessel,
       attached to a bottom of the core basket, and
       including a routing tube that routes the cable of the incore instrument through the 180° turn,
   the method comprising:
       retracting the cable to move the sensor
           out of the guide tube of the nuclear reactor core and
           into the routing tube of the bottom support element;
       performing maintenance on the nuclear reactor, including replacing the guide tube with a different guide tube; and
       re-inserting the cable to move the sensor
           out of the routing tube of the bottom support element and
           into the different guide tube.

15. The method of claim 14 wherein the retracting and the re-inserting are blind operations in which the position of the incore instrument is not visibly observable.

16. The method of claim 15 wherein the re-inserting includes monitoring a signal from the incore instrument to determine placement of the incore instrument in the reactor core.

* * * * *